United States Patent
Krishnan et al.

(10) Patent No.: US 9,816,018 B2
(45) Date of Patent: Nov. 14, 2017

(54) POLYURETHANE SEALANT BASED ON POLY(BUTYLENE OXIDE) POLYOLS FOR GLASS SEALING

(71) Applicant: DOW GLOBAL TECHNOLOGIES LLC, Midland, MI (US)

(72) Inventors: Bindu Krishnan, Lake Jackson, TX (US); Laura A. Grier, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 165 days.

(21) Appl. No.: 14/763,516

(22) PCT Filed: Mar. 21, 2014

(86) PCT No.: PCT/US2014/031521
§ 371 (c)(1),
(2) Date: Jul. 26, 2015

(87) PCT Pub. No.: WO2014/160617
PCT Pub. Date: Oct. 2, 2014

(65) Prior Publication Data
US 2016/0002512 A1    Jan. 7, 2016

Related U.S. Application Data

(60) Provisional application No. 61/806,051, filed on Mar. 28, 2013.

(51) Int. Cl.
| | |
|---|---|
| E06B 3/663 | (2006.01) |
| C09J 175/08 | (2006.01) |
| C03C 27/10 | (2006.01) |
| E06B 3/673 | (2006.01) |
| C08G 18/48 | (2006.01) |

(Continued)

(52) U.S. Cl.
CPC ............. *C09J 175/08* (2013.01); *B32B 7/12* (2013.01); *B32B 17/06* (2013.01); *C03C 27/10* (2013.01); *C08G 18/3275* (2013.01); *C08G 18/36* (2013.01); *C08G 18/4812* (2013.01); *C08G 18/4854* (2013.01); *C08G 18/6674* (2013.01); *C08G 18/6688* (2013.01); *C08G 18/6696* (2013.01); *E06B 3/66342* (2013.01); *E06B 3/6733* (2013.01); *B32B 2307/102* (2013.01); *B32B 2419/00* (2013.01); *B32B 2605/006* (2013.01); *C08G 2190/00* (2013.01); *Y02B 80/22* (2013.01)

(58) Field of Classification Search
CPC ..... E06B 3/66342; Y02B 80/22; Y02B 80/24; B32B 2605/006
See application file for complete search history.

(56) References Cited

U.S. PATENT DOCUMENTS 4,807,419 A * 2/1989 Hodek ................... E06B 3/677
52/172

FOREIGN PATENT DOCUMENTS

| EP | 344540 A | 6/1989 |
|---|---|---|
| WO | 2011/078922 A | 6/2011 |
| WO | 2012/064971 A | 5/2012 |

* cited by examiner

*Primary Examiner* — Donald J Loney

(57) ABSTRACT

A polyurethane glass sealant is made by reacting a poly(1,2-butylene oxide) polymer with a chain extender and a polyisocyanate. The poly(1,2-butylene oxide) polymer may be used as a mixture with up to 50% by weight of other polyols, including castor oil. The sealant is especially useful as a secondary sealant for an insulated glass unit (IGU).

7 Claims, 1 Drawing Sheet

(51) Int. Cl.
*C08G 18/66* (2006.01)
*C08G 18/32* (2006.01)
*C08G 18/36* (2006.01)
*B32B 7/12* (2006.01)
*B32B 17/06* (2006.01)

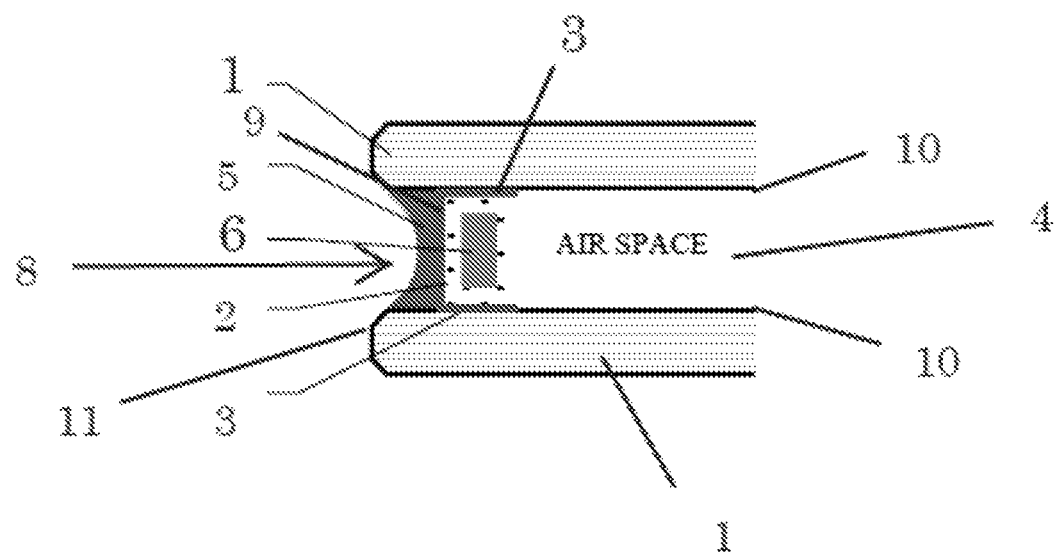

POLYURETHANE SEALANT BASED ON POLY(BUTYLENE OXIDE) POLYOLS FOR GLASS SEALING

This invention relates to a polyurethane sealant for glass sealing, to a method of sealing glass surfaces, to a method for making insulated glass units and to insulated glass units sealed with a polyurethane sealant.

Sealants are often applied to glass windows to bond the glass to a frame or other substrate and prevent gas and water leakage around the edges. An example of this is automotive windshields. In addition, many building glazing applications rely on a sealant to bond the glass to the frame structure. The general requirements for these materials are that they be elastomeric and that they bond well to glass and other materials. In addition, they need to form good barriers against the penetration of gases and liquids. To accomplish this, the sealant materials need to prevent leakage at the interface between the sealant and the substrates, as well as through the sealant material itself.

A glazing application of commercial significance is insulating glass units (IGUs). IGUs generally comprise two or more parallel glass panes held a small distance apart by a spacer. The space enclosed between the panes typically holds a vacuum or is filled with air or an inert gas such as argon, helium or xenon. The vacuum or trapped inert gas contributes much of the thermal insulation properties of these IGUs. Sealants hold the unit together and provide a barrier to the passage of gas into and out of the enclosed space between the panes. This is important to maintain the thermal insulation properties of the units. In addition, the sealants prevent water from permeating into the unit. This helps to prevent fogging.

IGUs typically make use of two different sealant materials. A "primary" sealant is used to seal the glass panes directly to a spacer, which as its name implies defines the spacing between adjacent glass panes and therefore the thickness of the enclosed vacuum or gas space. The material of choice as the primary sealant is polyisobutylene, which is an excellent barrier to both moisture and gasses. However, polyisobutylene does not provide the mechanical properties and adhesive strength that are needed. Therefore, it is typical to manufacture the IGU using a secondary sealant. This secondary sealant provides the necessary adhesion and mechanical strength, but also is important in preventing the passage of moisture and gas into and out of the unit, especially if the primary sealant becomes damaged or degraded over time.

The highest-performing polyurethane secondary sealant currently used in IGU is based on a polybutadiene polyol. These polyurethanes have excellent moisture vapor permeation rates but suffer from inadequate UV stability. Because of the poor UV stability, these polyurethane sealants degrade over time, and the life of the IGU is shortened. These polyurethanes are also susceptible to hydrolytic instability.

Other polyurethane secondary sealants have performed even less well. Those based on polymers of propylene oxide suffer from high permeabilities to both moisture vapor and gases. They also show poor UV stability and sometimes inadequate hydrolytic stability, and IGUs containing them have short lifetimes.

Low water permeability often does not correlate to low gas permeability in substantially non-cellular polymers. That is because low water permeability is favored by a high level of hydrophobicity in the sealant polymer, and increasing hydrophobicity tends to favor permeation by atmospheric gases and non-polar gases such as argon that is commonly used to fill the space between the glass panes of an IGU. Therefore, measures that tend to decrease water permeability often are seen to have an adverse impact on gas permeability, and vice versa.

Still another drawback of the polyurethanes is that large quantities of a plasticizer compound often must be included in the formulation for processing reasons. The polyurethane is typically made by mixing a polyol component with a polyisocyanate compound. The significant differences in the viscosities between these components can lead to difficulties in mixing; thereby requiring longer mixing times. Due to the reactive nature of the components used, there are processing drawbacks related to viscosity increase and exotherm. The plasticizer is included to reduce the viscosity of the polyol component to facilitate mixing, to ameliorate the viscosity increase during early stages of cure and to reduce the exotherm by acting as a heat sink. For these reasons, the plasticizer is widely understood to be necessary to process the polyurethane system with the equipment used in the industry. Over time, this plasticizer can leach into the space between the glass panes and cause fogging. This potential for fogging can be ameliorated by reducing the plasticizer level or eliminating it completely.

Therefore, it would be desirable to provide a thermosetting, elastomeric sealant for glass installations, which sealant has good processing characteristics, exhibits good adhesion to glass, provides the needed barrier to gasses and liquids (including atmospheric moisture) and has the necessary physical properties, UV stability and hydrolytic stability.

This invention is in one aspect a process for forming a seal between glass and a substrate, comprising:

a) forming a curable reaction mixture by combining ingredients including 1) a poly(1,2-butylene oxide) polyol having a hydroxyl equivalent weight of at least 500, or a mixture of 50 to 99% by weight of a poly(1,2-butylene oxide) polyol having a hydroxyl equivalent weight of at least 500 with 1 to 50% by weight of at least one other polyol selected from (i) polymers and copolymers of propylene oxide having an equivalent weight of at least 300 and (ii) a hydroxyl-containing fat or oil, wherein component 1) has an average nominal functionality of at least 2.2 hydroxyl groups per molecule; 2) at least one chain extender and 3) at least one organic polyisocyanate, wherein the isocyanate index is 70 to 130;

b) applying the curable reaction mixture to an interface between said glass and said substrate and in contact with both said glass and said substrate;

c) curing the curable reaction mixture to form an elastomeric seal between the glass and the substrate.

In specific embodiments, the invention is a process for producing an edge seal for a multi-pane glass assembly, wherein the multi-pane glass assembly comprises at least one pair of substantially parallel glass sheets, the glass sheets of said pair being separated from each other by one or more spacers positioned between the pair of glass sheets and at or near at least one edge of the glass sheets; the process comprising a) applying a curable reaction mixture to said at least one edge of the pair of glass sheets and into contact with each of the pair of glass sheets and the spacer(s) separating said pair of glass sheets and b) curing the curable reaction mixture to form an elastomeric edge seal between the pair of glass sheets and adherent to the spacer(s) separating the pair of glass sheets;

wherein the curable reaction mixture contains 1) a poly (1,2-butylene oxide) polyol having a hydroxyl equivalent weight of at least 500, or a mixture of 50 to 99% by weight of a poly(1,2-butylene oxide) polyol having a hydroxyl equivalent weight of at least 500 with 1 to 50% by weight of at least one other polyol selected from (i) polymers and copolymers of propylene oxide having a hydroxyl equivalent weight of at least 300 and (ii) a hydroxyl-containing fat or oil, wherein component 1) has an average nominal functionality of at least 2.2 hydroxyl groups per molecule; 2) at least one chain extender and 3) at least one organic polyisocyanate, and wherein the isocyanate index is 70 to 130.

The invention is also a multi-pane glass assembly comprising at least one pair of substantially parallel glass sheets, the glass sheets of said pair being separated from each other by one or more spacers positioned between the pair of glass sheets at or near at least one edge of the glass sheets, and an elastomeric edge seal bonded to said edge of the glass sheets and the spacer(s), wherein the elastomeric edge seal is a polymer formed by curing a curable reaction mixture formed by combining ingredients including 1) a poly(1,2-butylene oxide) polyol having a hydroxyl equivalent weight of at least 500, or a mixture of 50 to 99% by weight of a poly(1,2-butylene oxide) polyol having a hydroxyl equivalent weight of at least 500 with 1 to 50% by weight of at least one other polyol selected from (i) polymers and copolymers of propylene oxide having a hydroxyl equivalent weight of at least 300 and (ii) a hydroxyl-containing fat or oil, wherein component 1) has an average nominal functionality of at least 2.2 hydroxyl groups per molecule; 2) at least one chain extender and 3) at least one organic polyisocyanate, wherein the isocyanate index is 70 to 130.

This invention provides a readily-processable, thermosetting, elastomeric sealant for glass installations. The sealant composition does not require the presence of thiram or manganese dioxide, which preferably are absent from the composition. The cured sealant forms a strong elastomeric seal between glass and a substrate material, with good adhesion and low permeability to gases and liquids.

The FIGURE is a side view of a multipane glass assembly sealed with an elastomeric seal, in accordance with the invention.

In this invention, a seal is formed between glass and a substrate. By "glass", it is meant any inorganic amorphous material having a glass transition temperature of at least 100° C. It preferably is transparent to visible light. A preferred type of glass is a silica glass, by which is meant a glass containing 50% or more by weight silica. Among the silica glasses are fused silica glass, soda-lime-silica glass, sodium borosilicate glass, lead oxide glass, aluminosilicate glass and the like. Another preferred type of glass is so-called "oxide glass", which contains alumina and a minor amount of germanium oxide.

The glass may have one or more coatings on either or both of its main surfaces. Examples of such coatings include reflective coatings of various types, such as IR, UV or visible light reflective surfaces, IR absorbers, UV absorbers, tints or other coloring layers, and the like.

The glass may have a multi-layer construction. For example, the glass may consist of two or more glass layers bonded by one or more intermediate layers of an adhesive polymer.

The substrate can be any solid material, including, for example, a metal, a ceramic, another glass, an organic polymer, a lignocellulosic material such as wood, paper, cotton and the like or another biological or natural material. An organic polymer may be, for example, a synthetic or biological-origin polymer, and may be a thermoplastic or a thermoset.

In specific embodiments, the glass forms a window for a vehicle, building or other construction and the substrate is a frame element to which the window is affixed. The frame element may be a vehicle frame structure (or a part thereof). The frame element may be a window sash, door stile or other structural support to which the window is affixed.

In other specific embodiments, the substrate is a spacer for a multi-pane glass assembly such as an insulating glass unit (IGU). Such a multi-pane assembly comprises at least one pair of substantially parallel glass sheets. The glass sheets are separated from each other by one or more peripheral spacers positioned between the glass sheets at or near at least one edge. A multi-pane assembly may contain any larger number of substantially parallel glass sheets, with each adjacent pair being separated by a peripheral spacer.

A representation of a multi-pane assembly is shown in the Figure. In the Figure, substantially parallel glass panes 1 are separated by spacer 2 near edge 11, defining space 4 between the two glass panes 1. As is typical, spacer 2 is recessed slightly from edge 11, leaving a cavity 8 that is defined by the interior faces 10 of each of panes 1 and the exterior surface 9 of spacer 2. Spacer 2 typically is positioned along the substantial length of edge 11 of glass panes 1, and more typically spacers such as spacer 2 will be positioned about the entire periphery of glass panes 1. Sealant 5 of this invention is bonded to said edge 11 of the glass sheets 1 and to spacer 2, forming a seal between each of glass panes 1 and spacer 2, and between glass panes 1. As shown, sealant 5 occupies cavity 8 formed defined by the interior faces 10 of each of panes 1 and the exterior surface 9 of spacer 2.

In the particular embodiment shown in the Figure, spacer 2 is hollow, and is filled with optional desiccant 6. Desiccant 6 often is provided to absorb moisture from the gas contained within space 4. Space 4 is typically filled with a gas such as air, nitrogen, helium argon, xenon and the like.

Also shown in the Figure are primary sealants 3, which are optional but are often included in insulating glass units. Primary sealants 3 are closest to the air gap between glass sheets 2 and are generally present to keep moisture vapor and gasses from moving in and out of space 4. Primary sealant 3 is preferably polyisobutylene, but may be another polymer having barrier properties.

Sealant 5 is a reaction product of a curable reaction mixture formed by combining at least the following ingredients:

1) a poly(1,2-butylene oxide) polyol having a hydroxyl equivalent weight of at least 500 or a mixture of 50 to 99% by weight of a poly(1,2-butylene oxide) polyol having a hydroxyl equivalent weight of at least 500 with 1 to 50% by weight of at least one other polyol selected from (i) polymers and copolymers of propylene oxide having a hydroxyl equivalent weight of at least 300 and (ii) a hydroxyl-containing fat or oil, wherein component 1) has an average nominal functionality of at least 2.2 hydroxyl groups per molecule; 2) at least one chain extender and 3) at least one polyisocyanate, and wherein the isocyanate index is 70 to 130.

The poly(1,2-butylene oxide) polyol is a homopolymer of 1,2-butylene oxide, or a copolymer thereof with up to 25%, preferably up to 10% and more preferably up to 5%, based on the combined weight of all monomers, of a copolymerizable alkylene oxide such as, for example, ethylene oxide, 1,2-propylene oxide, 2,3-butylene oxide, tetrahydrofuran, 1,2-hexane oxide, and the like. Poly(1,2-butylene oxide)

homopolymers are preferred. The poly(1,2-butylene oxide) polyol can be prepared in known fashion by polymerizing 1,2-butylene oxide (alone or together with one or more comonomers as described) in the presence of an initiator compound. The polymerization is generally catalyzed, using catalysts such as alkali metal hydroxide, double metal cyanide catalysts and the like.

The initiator compound(s) used in the polymerization contains on average, at least 1.8 groups that can be alkoxylated. The nominal functionality of the poly(1,2-butylene oxide) polyol is equal to the number of alkoxylatable sites on the initiator compound or, if a mixture of initiator compounds is used, the average number of alkoxylatable sites per molecule in the mixture. Preferred initiator compounds contain two or more hydroxyl groups, although compounds containing amine hydrogens are also useful. The initiator compound preferably has an equivalent weight per alkoxylatable site of 15 to 150 and more preferably 30 to 75. Examples of suitable initiator compounds include ethylene glycol, diethylene glycol, triethylene glycol, 1,2-propane diol, dipropylene glycol, tripropylene glycol, 1,4-butane diol, cyclohexane dimethanol, glycerin, trimethylolethane, trimethylolpropane, erythritol, pentaerythritol, ethylene diamine, propylene diamine, aniline, toluene diamine, and the like.

The poly(1,2-butylene oxide) polyol preferably has a nominal functionality of 2 to 3, more preferably 2 to 2.5, and an equivalent weight per hydroxyl group of 500 to 3000, especially 800 to 2500 and most preferably 800 to 1500.

The poly(1,2-butylene oxide) polyol may be the only high equivalent weight (i.e., 200 g/equivalent or more) polyol in the reaction mixture, if it has a nominal functionality of at least 2.2. If the poly(1,2-butylene oxide) polyol has a nominal functionality below 2.2, it is necessary to provide a second polyol to increase the average nominal functionality to at least 2.2. Such a second polyol may also be present even if the nominal functionality of the poly(1,2-butylene oxide) polyol is 2.2 or greater.

In some embodiments, the second polyol is a polymer or copolymer of propylene oxide that has a hydroxyl equivalent weight of at least 300. The propylene oxide may be 1,3-propylene oxide, but more typically is 1,2-propylene oxide. If a copolymer, the comonomer is another copolymerizable alkylene oxide such as, for example, ethylene oxide, 2,3-butylene oxide, tetrahydrofuran, 1,2-hexane oxide, and the like. A copolymer may contain 75% or more by weight, preferably 85% or more polymerized propylene oxide, based on the total weight of polymerized alkylene oxides. A copolymer preferably contains no more than 15%, especially no more than 5% by weight polymerized ethylene oxide. The polymer or copolymer of propylene oxide should have a nominal functionality of at least 2.0. The nominal functionality preferably is 2.5 to 6, more preferably 2.5 to 4 or 2.5 to 3. The hydroxyl equivalent weight of the polymer or copolymer of propylene oxide is at least 300, preferably at least 500, more preferably 500 to 3000, in some embodiments 800 to 2500 and in particular embodiments from 800 to 1500.

The polymer or copolymer of propylene oxide can be made in the same general manner as described with respect to the 1,2-butylene oxide polymer, except for the selection of monomers. Suitable initiator compounds to produce the polymer or copolymer of propylene oxide include those described above with respect to the 1,2-butylene oxide polymer.

In other embodiments, the second polyol is a hydroxyl-containing fat or oil. The hydroxyl-containing fat or oil should contain an average of at least two, preferably at least 2.2 hydroxyl groups per molecule. Suitable such oils include naturally-occurring plant oils such as castor oil and lesquerella oil. Castor oil is a preferred hydroxyl-containing oil.

Mixtures of two or more of the foregoing second polyols can be present.

When a mixture of polyols is used, the poly(1,2-butylene oxide) constitutes 50 to 99% by weight of the mixture, and the second polyol(s) constitutes 1 to 50% thereof. The poly(1,2-butylene oxide) preferably constitutes 70 to 99% by weight of the mixture, and more preferably 70 to 90% by weight of the mixture, with the second polyol(s) correspondingly constituting the remainder of the weight of the mixture.

Component 1) has an average nominal hydroxyl functionality of at least 2.2, and preferably at least 2.3. Its average nominal hydroxyl functionality may be as high as six, but preferably is up to 4 and more preferably up to 3. The average hydroxyl equivalent weight of component 1) may be from about 500 to 3000, and is more preferably 500 to 1500 and still more preferably from 600 to 1200.

Especially preferred as Component 1) is a mixture of 70 to 95% by weight of a poly(1,2-butylene oxide) polymer as described before and 5 to 30% by weight of castor oil. Such especially preferred mixtures may contain 85 to 95% by weight of the poly(1,2-butylene oxide) and 5 to 15% by weight of castor oil. In these especially preferred embodiments, the poly(1,2-butylene oxide) polyol preferably has a nominal functionality of 2 to 3, more preferably 2 to 2.5, and an equivalent weight per hydroxyl group of 500 to 3000, especially 800 to 2500 and most preferably 800 to 1500.

Component 2) is a chain extender, by which is meant a compound having exactly two isocyanate-reactive groups and a weight per isocyanate-reactive group of up to 300, preferably 30 to 150, and more preferably 30 to 75. The isocyanate-reactive groups may be, for example, hydroxyl, primary amino or secondary amino groups. Hydroxyl groups are generally preferred. Examples of hydroxyl-containing chain extenders are ethylene glycol, 1,2-propane diol, 1,3-propane diol, 1,4-butane diol, 2,2,4-trimethylpentane-1,3-diol, 2-ethylhexane diol, N,N-bis(2-hydroxylpropyl)aniline, diethylene glycol, triethylene glycol, dipropylene glycol, tripropylene glycol, cyclomethanedimethanol, and the like. Among these, the linear, acyclic, hydroxyl chain extenders are generally preferred, and α,ω-alkylene glycols and α,ω-polyalkylene glycols such as ethylene glycol, 1,4-butane diol, 1,3-propane diol, diethylene glycol, triethylene glycol and the like are especially preferred.

The organic polyisocyanate advantageously contains an average of at least 2.0 isocyanate groups per molecule. A preferred isocyanate functionality is from about 2.0 to about 3.0 or from about 2.0 to about 2.5 isocyanate groups per molecule. The polyisocyanate advantageously has an isocyanate equivalent weight of 75 to 200. This is preferably from 80 to 170.

Suitable polyisocyanates include aromatic, aliphatic and cycloaliphatic polyisocyanates. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"- triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate. Any of the foregoing polyisocyanates may be modified to include urea, isocyanurate, uretidinedione, allophonate, biuret, carbodiimide, urethane or other linkages.

Among the preferred polyisocyanates are MDI, "liquid MDI" products in which MDI is modified to contain urea, uretonimine, allophonate, biuret, carbodiimide and/or urethane linkages to produce a material having a melting temperature below 20° C. and an isocyanate equivalent weight of 135 to 170, and the so-called polymeric MDI products, which are a mixture of polymethylene polyphenylene polyisocyanates in monomeric MDI.

The polyisocyanate is used in an amount sufficient to provide an isocyanate index of 70 to 130. Isocyanate index is calculated as the number of reactive isocyanate groups provided to the reaction mixture divided by the number of isocyanate-reactive groups provided to the reactive mixture, and multiplying by 100. A preferred isocyanate index is 90 to 125 and a more preferred isocyanate index is 95 to 115.

In addition, the amounts of polyisocyanate and chain extender (and any crosslinkers as may be present) are chosen together such that the polyurethane has a hard segment content of 10 to 50%, preferably 15 to 35% and more preferably 18 to 30% by weight. Hard segment content is calculated by dividing the combined weight of polyisocyanate(s), chain extender(s) and crosslinker(s) (if any) by the total weight of all polyisocyanate(s) and isocyanate-reactive materials (other than reactive catalysts, if any) provided to the reaction mixture.

The curable reaction mixture may contain other ingredients in addition to those already described. Among these are, for example, catalysts, plasticizers, crosslinkers, UV stabilizers, biocides, preservatives, adhesion promoters, colorants, fillers, desiccants and water scavengers, and the like.

Examples of catalysts include tertiary amines, tin carboxylates; organotin compounds; tertiary phosphines; various metal chelates; metal salts of strong acids, such as ferric chloride, stannic chloride, stannous chloride, antimony trichloride, bismuth nitrate and bismuth chloride, and the like. Tertiary amine and tin catalysts are generally preferred.

Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine,4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) amino-ethoxy ethanol, N,N,N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin-containing catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

The catalysts are typically used in small amounts, such as 0.0015 to 5, preferably from 0.01 to 1 part by weight per 100 parts by weight of polyol(s) plus polyisocyanate(s). Tin-containing catalysts are typically used in amounts towards the low end of these ranges.

A plasticizer may be present. If present, the plasticizer preferably is mixed with the poly(1,2-butylene oxide) polymer to reduce its viscosity and so facilitate mixing with the polyisocyanate, which typically has a much lower viscosity. Examples of suitable plasticizers include liquid (at 25° C.) esters of monocarboxylic acids and diesters of dicarboxylic acids having molecular weights of up to about 300. Among these are, for example, dialkyl phthalate esters, dialkyl terephthalate esters, trialkyl trimellitates, dialkyl adipate esters, dialkyl maleate esters, dialkyl sebacate esters, alkanolic acid diesters of alkylene glycols, alkanoic acid diesters of polyalkylene glycols, and the like. A preferred plasticizer is trimethylpentyl diisobutyrate.

The amount of plasticizer, if used, may range from 1 to 50% of the combined weight of the plasticizer and all reactive materials (isocyanates and isocyanate reactive materials) provided to the reaction mixture. An advantage of the invention is that often only small amounts of plasticizer are needed. Therefore, a preferred amount is from 1 to 20%, in some embodiments 5 to 15%, and in other embodiments 10 to 13% by weight, on the same basis as before. The use of a plasticizer tends to reduce tensile strength while increasing elongation and increasing sag. Since excessive sag can be a drawback, the ability to use small amounts of plasticizer (if any at all) can be a significant advantage of this invention. In addition, smaller amounts of plasticizer in the sealant reduce the risk and severity of fogging due to the leaching of the plasticizer.

Crosslinkers are for purposes of this invention compounds having at least three isocyanate-reactive groups per molecule and an equivalent weight per isocyanate-reactive group of less than 200, preferably 30 to 150. Examples of crosslinkers include glycerin, trimethylolpropane, trimethylolethane, pentaerythritol, erythritol, sorbitol, and alkoxylates of any of the foregoing having an equivalent weight of up to 300. If used at all, crosslinkers are generally present in small quantities, such as up to 5% of the weight of the curable reaction mixture.

Fillers can be present to provide desired rheological properties and reduce cost. Examples of fillers include inorganic particulate materials such as talc, titanium dioxide, calcium carbonate, mica, wollastonite, fly ash and the like; metal particles; carbon black; graphite; high melting organic polymers, and the like. The particle size of these fillers (as determined using screening methods) may be up to 50 microns, preferably 0.2 to 30 microns. Fillers may constitute up to 90% by weight of the curable reaction mixture, preferably 25 to 80% by weight.

A seal is formed in accordance with the invention by forming a curable reaction mixture, applying it to an interface between and in contact with said glass and said substrate and then curing the curable reaction mixture to form an elastomeric seal between the glass and the substrate.

The reaction mixture is formed by mixing the foregoing necessary and optional (if any) components. It is generally preferred to formulate the starting ingredients into two components. The first component includes the isocyanate-reactive components, including component 1), the chain extender (component 2) and any crosslinker. The second component includes the polyisocyanate compound(s). The catalyst(s) can be formulated into either or both of these components, but preferably are formulated into the first component. The plasticizer if any is preferably incorporated into the first component.

Mixing and application can be done in any convenient manner. In the preferred case in which the ingredients are formulated into two components, the components are simply combined at ambient temperature or any desirable elevated temperature, deposited onto the interface between glass and substrate, and allowed to react. The mixing of the components can be done in any convenient way, depending on the particular application and available equipment. Mixing of the components can be done batchwise, mixing them by hand or by using various kinds of batch mixing devices, followed by application by brushing, pouring, applying a bead and/or in other suitable manner. The two components can be packaged into separate cartridges and simultaneously dispensed through a static mixing device to mix and apply them, typically as a bead, onto the interface.

Spraying methods are also useful. In a spraying method, the individual ingredients or formulated components are brought under pressure to a mixhead, where they are combined and dispensed under pressure to the interface between glass and substrate.

Other continuous metering and dispensing systems also are useful to mix and dispense the reaction mixture and apply it to the interface between glass and substrate.

Curing in many cases proceeds spontaneously at room temperature (about 20° C.), and in such cases can be effected without application of heat. The curing reaction is generally exothermic, and a corresponding temperature rise may occur.

A faster and/or more complete cure often is seen at higher temperatures, and for that reason it may be desirable in some embodiments to apply heat to the applied reaction mixture. Therefore, a wide range of curing temperatures can be used, such as, for example, a temperature from 0 to 180° C. A more typical range is from 4 to 120° C., and a preferred range is 10 to 80° C. This can be done, for example, by (a) heating one or more of the starting materials prior to mixing it with the others to form the reaction mixture and/or (b) heating the reaction mixture after it has been formed by combining the raw materials.

Multi-pane glass assemblies made in accordance with the invention are useful as insulating glass units, as solar modules, and the like.

The following examples are provided to illustrate the invention, but not limit the scope thereof. All parts and percentages are by weight unless otherwise indicated.

EXAMPLES 1-4

Example 1 is prepared as follows: A polyol blend is prepared by mixing 50 parts of a 2000 molecular weight difunctional poly(1,2-butylene oxide) homopolymer, and 50 parts a 3000 molecular weight nominally trifunctional poly (1,2-propylene oxide) homopolymer. To this blend are added 4.5 parts 1,4-butanediol and about 0.04 parts of a tin catalyst. This blend is mixed with a 143 isocyanate equivalent weight "liquid" MDI product at an isocyanate index of 1.02 to form a reaction mixture. The resulting cured elastomer contains 25.2% hard segment. The reaction mixture is compression molded at 50° C. for 30 minutes under an applied pressure of 20,000 psi (about 140 MPa) for 30 minutes. Tensile strength and elongation are measured according to ASTM 1708, and are as reported in Table 1 below. Results are as indicated in Table 1.

Examples 2-6 are made in the same manner, except in each case the 1,4-butanediol is replaced with another chain extender, as indicated in Table 1. The amount of chain extender and the hard segment content of the elastomers are as indicated in Table 1. For Examples 3-6, the Shore A hardness is measured according to ASTM D2240.

TABLE 1

| Example No. | Chain Extender, amount (parts) | Hard Segment Content, % | Tensile Strength, MPa (psi) | Elongation, % | Shore A Hardness |
|---|---|---|---|---|---|
| 1 | 1,4-butanediol, 4.5 | 25.2 | 4.07 (590) | 324 | ND |
| 2 | 2,2,4-trimethyl pentane-1,3-diol, 6.5 | 25.5 | 1.72 (250) | 485 | ND |
| 3 | 2-ethyl hexane diol, 6.5 | 25.5 | 1.71 (248) | 505 | 30 |
| 4 | 1,2-propane diol, 4 | 25.4 | 2.65 (384) | 538 | 35 |
| 5 | 1,3-propane diol, 4 | 25.4 | 1.74 (252) | 539 | 31 |
| 6 | N,N-bis(2-hydroxylpropyl)aniline, 8 | 25.2 | 340 (234) | 450 | 40 |

When used to seal the edge of a multi-pane glass assembly, each of Examples 1 through 6 demonstrates excellent adhesion to the glass and spacer, and forms a high quality seal.

EXAMPLES 7-11

Example 7 is prepared by mixing 70 parts of a 2000 molecular weight difunctional poly(1,2-butylene oxide) homopolymer with 30 parts castor oil. To this blend are added 1.5 parts 1,4-butanediol and 0.04 parts of a tin catalyst. The amount of 1,4-butanediol is selected so that the resulting cured elastomer contains 25% hard segment when cured at a 1.1 isocyanate index. This mixture is then combined with a 143 isocyanate equivalent weight "liquid" MDI product at an isocyanate index of 1.1 to form a reaction mixture, which is cured as described with respect to Examples 1-6. Tensile strength, elongation and Shore A hardness are measured as before, with results as are indicated in Table 2 below.

Samples of the cured films are cut into dog-bones for evaluating the effect of water immersion on mechanical properties. The initial weight ($W_0$) of the films is determined. The film is in each case then immersed for 24 hours in DI water maintained at 25° C. or in boiling water for 1 hour. After the specified time, the film is then dried with a tissue to remove surface water and weighed to obtain weight $W_1$. The water absorption is calculated using equation:

Water uptake=$(W_1-W_0)/W_0 \times 100\%$

Examples 8-11 are prepared and tested in the same manner, except the ratio of poly(1,2-butylene oxide) homopolymer and castor oil is varied as indicated in Table 2.

TABLE 2

| | | | Mechanical Properties | | |
|---|---|---|---|---|---|
| Ex. No. | Poly(BO)/Castor Oil Ratio[1] | Water uptake, wt-% | Tensile Strength, MPa (psi) | Elongation, % | Shore A hardness |
| 7 | 70/30 | 0.69 | 2.41 (350) | 295 | 55 |
| 8 | 75/25 | 0.72 | 2.05 (297) | 294 | 50 |
| 9 | 80/20 | 0.79 | 1.86 (270) | 236 | 50 |
| 10 | 85/15 | 0.81 | 1.92 (279) | 450 | 39 |
| 11 | 90/10 | 0.92 | 1.57 (227) | 445 | 33 |

[1]The weight ratio of the poly(butylene oxide) diol and the castor oil in the formulation.

When used to seal the edge of a multi-pane glass assembly, each of Examples 7 through 11 demonstrates excellent adhesion to the glass and spacer, and forms a high quality seal.

EXAMPLE 12

A sealant composition is made and cured in the general manner described in the previous examples. The formulation is 85 parts of a 2000 molecular weight difunctional poly(1,2-butylene oxide) homopolymer, 15 parts castor oil, 1.5 parts of 1,4 butanediol, 0.05 parts of tin catalyst and 26.3 parts of the 143 equivalent weight "liquid" MDI. The resulting elastomer is cured at 50° C. for three days. Its tensile strength is about 200 MPa (290 psi) and its elongation is about 440. The water uptake is 0.8% by weight.

Moisture Vapor Transmission Rates (MVTR) are analyzed on a MOCON Permatran-W 3/33 Water vapor permeability instrument. Standards that apply to the instrument include ASTM F-1249, TAPPI T557 and JIS K-7129. The moisture vapor transmission rate is 1.6 g/(100 in$^2$/day) (0.103 g/m$^2$/day).

Oxygen Transmission Rates (OTR) are analyzed on a MOCON Oxtran 2/21 instrument. Standards that apply to the instrument include ASTM D-3985, ASTM F-1927, DIN 53380, JIS K-7126 and ISO CD 15105-2. The oxygen transmission rate is 80 mL/(100 in$^2$/day) (5.16 mL/m$^2$/day).

The moisture vapor transmission and oxygen transmission values indicate the suitability of this elastomer for use as a secondary sealant in an IGU.

EXAMPLES 13-18

Example 13 is prepared by mixing 85 parts of a 2000 molecular weight difunctional poly(1,2-butylene oxide) homopolymer with 15 parts of castor oil. To this blend are added 1.5 parts of 1,4-butanediol and 0.04 parts of a tin catalyst. 50 Parts of trimethyl pentanyl diisobutyrate (TXIB plasticizer from Eastman Chemicals) are added, as are 268.5 parts of calcium carbonate particulates, 2 parts of a silane adhesion promoter, 2 parts of an antioxidant and 5 parts by weight of a color paste. The resulting mixture is then combined with 24.4 parts of a 143 isocyanate equivalent weight "liquid" MDI product to form a reaction mixture, which is cured as described with respect to Examples 1-6.

Tensile strength, elongation and Shore A hardness are measured as before, with results as are indicated in Table 3 below.

Examples 14-18 are prepared and tested in the same manner, except the amount of plasticizer is varied as indicated in Table 3.

TABLE 3

| | | Mechanical Properties | | |
|---|---|---|---|---|
| Ex. No. | Plasticizer parts by weight | Tensile Strength, MPa (psi) | Elongation, % | Shore A hardness |
| 13 | 50 | 4.00 (580) | 168 | 65 |
| 14 | 45 | 2.85 (414) | 248 | 62 |
| 15 | 40 | 2.81 (408) | 308 | 60 |
| 16 | 30 | 2.93 (425) | 328 | 60 |
| 17 | 20 | 2.00 (291) | 260 | 38 |
| 18 | 10 | 1.87 (271) | 277 | 35 |

When used to seal the edge of a multi-pane glass assembly, each of Examples 13 through 18 demonstrates excellent adhesion to the glass and spacer, and forms a high quality seal.

All of these formulations have viscosities low enough to process easily even though many of them, especially Example 18, contain only a small amount of plasticizer and have high filler levels.

What is claimed is:

1. A multi-pane glass assembly comprising at least one pair of substantially parallel glass sheets, the glass sheets of said pair being separated from each other by one or more spacers positioned between the pair of glass sheets at or near at least one edge of the glass sheets, and an elastomeric edge seal bonded to said edge of the glass sheets and the spacer(s), wherein the elastomeric edge seal is a polymer formed by
    curing a curable reaction mixture formed by combining ingredients including 1) a poly(1,2-butylene oxide) polyol having a hydroxyl equivalent weight of at least 500, or a mixture of 50 to 99% by weight of a poly(1,2-butylene oxide) polyol having a hydroxyl equivalent weight of at least 500 with 1 to 50% by weight of at least one other polyol selected from (i) polymers and copolymers of propylene oxide having a hydroxyl equivalent weight of at least 300 and (ii) a hydroxyl-containing fat or oil, wherein component 1) has an average nominal functionality of at least 2.2 hydroxyl groups per molecule; 2) at least one chain extender and 3) at least one organic polyisocyanate, wherein the isocyanate index is 70 to 130.

2. The multi-pane glass assembly of claim 1, wherein the poly(1,2-butylene oxide) polyol preferably has a nominal functionality of 2 to 2.5 and an equivalent weight per hydroxyl group of 800 to 1500.

3. The multi-pane glass assembly of claim 2, wherein the poly(1,2-butylene oxide) has an average nominal hydroxyl functionality of at least 2.2 and is the only polyol having a hydroxyl equivalent weight of 200 or more in the reaction mixture.

4. The multi-pane glass assembly of claim 3 wherein component 1) is a mixture of 70 to 95% by weight of the poly(1,2-butylene oxide) polymer and 5 to 30% by weight of castor oil.

5. The multi-pane glass assembly of claim 4 wherein component 1) is a mixture of 85 to 95% by weight of the poly(1,2-butylene oxide) polymer and 5 to 15% by weight of castor oil.

6. The multi-pane glass assembly of claim 2 wherein the chain extender is 1,4-butane diol or 1,3-propane diol.

7. The multi-pane glass assembly of claim 2 which is an insulated glass unit, and the sealant is a secondary sealant.

* * * * *